Patented Aug. 10, 1926.

1,595,416

UNITED STATES PATENT OFFICE.

HAROLD R. RAFSKY, NOW BY JUDICIAL CHANGE OF NAME HAROLD ROBERT RAFTON, OF LAWRENCE, MASSACHUSETTS.

PAPER.

No Drawing.  Application filed April 3, 1922. Serial No. 549,202.

My invention relates to a new and useful paper.

In the manufacture of paper, various kinds of fibrous constituents of vegetable, or animal, or mineral origin are used, such as mechanical or chemical wood pulp, rag pulp, straw pulp, esparto pulp, jute, hemp, asbestos or the like, or mixtures of one or more of these. These fibrous materials organic or inorganic may be admixed with one or more other substances, such as filler, size, size precipitant, coloring matter, and such additional materials as may enter into the composition of paper.

After sufficient treatment in the beating engine or such other machine or machines as are commonly employed for this purpose, the material is put through the subsequent necessary processes and apparatus and finally is run off either on a cylinder or Fourdrinier paper or board machine, and calendered if desired.

The paper may then be used directly for any purpose desired, and if properly sized may be used as body stock for coated paper. If the paper is to be coated, a somewhat concentrated watery suspension of clay, satin white, blanc fixe, or the like, to which has been added an appropriate adhesive is applied to the surface or surfaces of the paper body stock employing the machines generally in use for the purpose. The paper is then dried and calendered or otherwise finished, as desired.

My invention relates to a paper comprising fibrous materials usually employed, and a material for filling or coating the paper, comprising calcium carbonate and magnesium basic carbonate in an extremely minute state of subdivision, which filled or coated paper has not been hitherto made and which possesses advantages which will be hereinafter set forth.

In my copending application, process of manufacturing a composition of matter, filed April 4, 1921, Serial No. 458,522, I disclose a process of producing a composition of matter consisting of calcium carbonate and magnesium hydroxide in an extremely minute state of subdivision. One specific embodiment of that process comprises starting with a lime containing magnesia. I do not limit myself to a lime of definite magnesia content as I have found limes of various magnesia contents suitable for my purpose.

I have found it possible to carry out that process by exposing the unslaked lime containing magnesia in a suitable apparatus to very slightly moist carbon dioxide, for a sufficient length of time until substantially all the calcium present is converted to calcium carbonate ($CaCO_3$), and then exposing the material to water or steam. Also I have found it possible to carry out that process by exposing the unslaked lime containing magnesia to the action of carbon dioxide, containing considerable amounts of water vapor or steam, for a sufficient length of time, until substantially all the calcium is converted to calcium carbonate ($CaCO_3$), following this, if necessary, by exposure to steam or water; or water may be added to the lime at the same time it is being exposed to the moist carbon dioxide. Also I have found it possible to carry out that process by slaking the lime, and then subjecting the slaked lime in a dry form to carbon dioxide, preferably slightly moist, until substantially all the calcium present in converted to calcium carbonate ($CaCO_3$).

But I prefer the procedure whereby the lime is first thoroughly slaked, and then subjected in the presence of greater or lesser amounts of water to the action of carbon dioxide until substantially all the calcium hydroxide ($Ca(OH)_2$) is converted into calcium carbonate ($CaCO_3$).

The subjection to the action of carbon dioxide may take place hot or cold, under atmospheric or other pressure as desired, but inasmuch as more carbon dioxide can be absorbed in the cold under pressure, thus diminishing the time element, this is a convenient mode of operation.

The composition of matter produced is the desired calcium carbonate ($CaCO_3$) and magnesium hydroxide ($Mg(OH)_2$), in the desired extremely minute state of subdivision.

In the above reactions, if more than enough carbon dioxide is used than is required to satisfy the calcium, the magnesium begins to be acted upon. In the presence of a considerable amount of water, however, this is of little immediate importance, as the magnesium stays in solution. Thus a considerable amount of magnesium may go into solution, without altering the qualitative composition of the material. Now if this solution of the magnesium be separated from the material (which is still the desired calcium carbonate and magnesium hydroxide), no basic carbonate will contaminate the material.

However, if the solution of magnesium is left in contact with the calcium carbonate and magnesium hydroxide for some time, or under conditions favoring the escape or expulsion of carbon dioxide, then basic carbonate may contaminate the material. Because, therefore, of this possible contamination, and the complication in process involved in separating the magnesium containing liquid, I prefer, as stated above, to add just enough carbon dioxide to completely carbonate the calcium; and to regulate carefully the addition of this carbon dioxide and follow the reaction by adequate control methods.

In the above case, it is my desire to produce a material of the composition of calcium carbonate and magnesium hydroxide.

In the present instance, however, it is my desire to produce a material for use in my new paper consisting of calcium carbonate and magnesium basic carbonate. This result is accomplished by using an excess of carbon dioxide in accordance with the procedure outlined below. Although it is possible to use this excess of carbon dioxide with any of the adaptations indicated above and produce the desired calcium carbonate and magnesium basic carbonate, I nevertheless preferably follow the favored procedure outlined above, i. e., I first slake my lime containing magnesia thoroughly with water and then subject it in the presence of greater or lesser amounts of water to the action of carbon dioxide, in excess of that amount required to satisfy the calcium.

As more and more carbon dioxide is introduced, greater amounts of magnesium go into solution until a point is reached where the calcium begins to dissolve as bicarbonate. I stop my reaction just prior to the point where the calcium would begin to dissolve. When the analysis of the lime used shows approximately equimolecular proportions of calcium and magnesium, and the reaction is carried out under pressure at a suitable concentration, about two thirds of the magnesium can be dissolved before the calcium begins to go into solution.

At this point, the composition of the material undissolved is the required calcium carbonate and magnesium basic carbonate.

Although the reaction may take place hot or cold, under atmospheric or other pressure, as desired, inasmuch as more carbon dioxide can be absorbed in the cold under pressure, thus diminishing the time element, that is a convenient mode of operation.

The liquid containing the magnesium in solution is separated by well known means, and may be treated for the recovery of magnesium, as by boiling, or otherwise utilized as desired.

Of course, if it is not desired to recover the magnesium as a by-product, the liquid containing the dissolved magnesium may be left in contact with the undissolved matter; and the entire body of liquid containing the dissolved magnesium and the undissolved solids may be put under diminished pressure, or preferably boiled, whereby the magnesium is thrown out of solution, and the resultant mass of insoluble material will have the composition I desire.

Of course also, if desired, the magnesium containing liquid may be separated from the solids, and placed under diminished pressure, or, preferably, boiled, and the material precipitated on boiling added to the solids, producing by this combination the material I desire.

Moreover, in the manufacture of my material, again in the case I do not desire to recover any magnesium as a by-product, I may then use any amount of carbon dioxide in excess of the amount indicated above, which under suitable conditions of concentration and pressure may result either in the solution of part of the calcium, or, in the extreme case, of the entire solids present, with the possible exception of small amounts of impurities. Then, by diminishing the pressure, or preferably by boiling, the total resulting solids will be the material I desire.

In any event, where the solution containing carbon dioxide is subjected to diminished pressure or boiling, the carbon dioxide given off may be reutilized if desired.

In the process outlined above, I do not restrict myself to a lime of any definite magnesia content, as I have found lines of various magnesia contents suitable for my purpose.

Inasmuch as I have found that a wide variation in the ratio of the calcium carbonate to the magnesium basic carbonate is permissible in the employment of my material in my new paper, I do not restrict myself to any definite ratio between these two compounds.

I have found various other ways of making my material to be used in my new paper, such as adding a soluble carbonate or carbonates to a solution of calcium and magnesium salts, or a mixture of a soluble hydroxide or hydroxides and a carbonate or carbonates; but as the essential thing is the production of a material for my new paper, consisting of calcium carbonate and magnesium basic carbonate, in an extremely minute state of subdivision, the process by which it is made is a matter of convenience and economic consideration only. Of course, I do not restrict myself to any specific form of apparatus in which to carry out the above reactions, as a number of suitable ones are available and will suggest themselves to one skilled in the art.

Also mechanical details such as flotation or sieving to remove extraneous matter or grit, filtration, washing, drying, or other well known methods of processing or handling materials, of course, may be employed in connection with, or supplementary to, the major operations; with utilization of apparatus suitable for the purpose.

The material, after manufacture, may be used in a more or less concentrated watery suspension, or dewatered into a pulp form, or it may be dried before use, as desired. Because of the extreme fineness of particles of my material, it does not settle readily or quickly in aqueous suspension, particularly if in concentrated aqueous suspension and therefore, if after its formation it be desired to dewater it, it should be filter-pressed.

The composition of magnesium basic carbonate is indefinite, but where I use the term in this specification, I mean a compound containing magnesium, hydroxyl, and carbonate radicles, with or without combined water, with no specified proportions of the different components.

In the material referred to above, of course, there may be present along with the calcium carbonate and magnesium basic carbonate, small amounts of other substances depending upon the purity of the raw materials employed and such variations as might normally be expected in commercial practice.

Having obtained my material, in one modification of my paper, I add the material to the pulp in a beating engine or similar compounding or mixing machine. There may be admixed suitable sizing agents and such other substances which are to enter into the composition of the finished paper, but the chief ingredients of this modification of my new paper are the fibrous constituent or constituents and the filling material.

The addition of the sizing agent or agents and size precipitant may be omitted in whole or in part at this stage of the process. The sizing agent or agents may or may not be incorporated at a point later in the process, as by the vat, tub, or animal sizing process, or by any process for surface sizing either directly on the paper machine or applied later, accordingly as sized or unsized paper is desired.

The word "paper" in this specification is intended to refer to any fibrous product which can be manufactured on a Fourdrinier or cylinder paper or board machine.

The advantages inherent in my new paper are that my paper, comprising the fibrous material, filler and such other ingredients as are suitable for use in paper, can be produced more cheaply than similar papers produced with fillers now commonly employed. This will give it a decided economic advantage over other papers now on the market. Moreover, if the filler is made of suitably selected raw materials, it may be of a high white color, which will enhance the color of the finished paper. Moreover, because of the homogeneity, and the extreme fineness of the filler, the resultant paper is in itself more homogeneous and uniform in quality than is the case where other now commonly employed fillers are used. Furthermore, my paper is more opaque than papers now made with fillers commonly employed, as my filler possesses greater opacity which it imparts to the paper.

Of course, if desired, other fillers may be incorporated with my filler in any desired ratio, but inasmuch as I desire to secure the maximum beneficial results from the use of my filler in my paper, I prefer to use it as the only filling constituent employed.

In another modification of my invention, I may desire to employ my material, consisting of calcium carbonate and magnesium basic carbonate for coating a paper "body stock." With the addition of a suitable adhesive or mixture of adhesives, the material may be used directly for coating paper "body stock," employing the machines generally used for this purpose; or there may be admixed with the material and adhesive mixture, other organic materials, adhesive or otherwise, or inorganic materials, adhesive or otherwise, or a combination of both classes of substances, such as may be used in the manufacture of coated paper and the entire mixture used to coat paper "body stock," employing the machines generally used for the production of "art" or coated paper. The coated paper produced may be calendered or otherwise finished as desired.

The words "coated paper" in this specification are to be understood as referring to the coated product produced by coating any type of paper coming under the definition of "paper" given above.

It is of course, possible to use the modification of my new paper which is filled with my material as a body stock for coating, but if such is the case, the paper must be suitably sized, as slack or unsized paper may not ordinarily be employed for coating.

Of course, any other suitable paper not containing my material as a filler may be employed as a "body stock" to be used for coating with my material.

The properties of this second modification of my invention, namely, the coated paper, which make it useful and distinguish it from other coated papers, (especially when the material consisting of calcium carbonate and magnesium basic carbonate is made of suitable raw materials), are its high whiteness, its relatively high opacity, its uniformity, and above all, its inexpensive cost of production, considering the high grade of paper which is produced.

By the expression "extremely minute state of subdivision", in this specification, I mean to include not only the case in which the ultimate particles of a material are in a state of microscopically minute subdivision, but also the case in which they are of such minuteness that they may be said to approach or be in the colloidal condition.

It is to be understood, of course, that the order of steps, methods of procedure, and details for the manufacture of my paper as outlined above are to be taken as preferred examples thereof, and do not limit the spirit of my invention or the scope of the subjoined claims.

Having thus described my invention, I claim:

1. A paper, one of whose constituents is a material consisting of calcium carbonate and magnesium basic carbonate, in an extremely minute state of subdivision.

2. A paper comprising fibrous material and a filler consisting of calcium carbonate and magnesium basic carbonate, in an extremely minute state of subdivision.

3. A paper comprising fibrous material and a filler consisting of calcium carbonate and magnesium basic carbonate, in an extremely minute state of subdivision, and suitable sizing.

4. A paper comprising fibrous material and a filler consisting of calcium carbonate and magnesium basic carbonate, in an extremely minute state of subdivision, and suitable sizing incorporated therein.

5. A paper comprising fibrous material and a filler consisting of calcium carbonate and magnesium basic carbonate, in an extremely minute state of subdivision, and suitable sizing on the surface.

6. A paper comprising fibrous material and a filler consisting of calcium carbonate and magnesium basic carbonate, in an extremely minute state of subdivision, and suitable sizing incorporated therein, and additional suitable sizing on the surface.

7. A paper comprising a paper body stock, whose surface is coated with a material consisting of calcium carbonate and magnesium basic carbonate, in an extremely minute state of subdivision, and an adhesive.

8. A paper comprising fibrous material, and a filler consisting of calcium carbonate and magnesium basic carbonate, in an extremely minute state of subdivision, and suitable sizing, whose surface is coated with a material consisting of calcium carbonate and magnesium basic carbonate, in an extremely minute state of subdivision, and an adhesive.

9. A paper comprising fibrous material and a filler consisting of calcium carbonate and magnesium basic carbonate, in an extremely minute state of subdivision, and suitable sizing incorporated therein, whose surface is coated with a material consisting of calcium carbonate and magnesium basic carbonate, in an extremely minute state of subdivision, and an adhesive.

10. A paper comprising fibrous material and a filler consisting of calcium carbonate and magnesium basic carbonate, in an extremely minute state of subdivision, and suitable sizing on the surface, whose surface is coated with a material consisting of calcium carbonate and magnesium basic carbonate, in an extremely minute state of subdivision, and an adhesive.

11. A paper comprising fibrous material and a filler consisting of calcium carbonate and magnesium basic carbonate, in an extremely minute state of subdivision, and suitable sizing incorporated therein, and additional suitable sizing on the surface, whose surface is coated with a material consisting of calcium carbonate and magnesium basic carbonate, in an extremely minute state of subdivision, and an adhesive.

In testimony whereof I affix my signature.

HAROLD R. RAFSKY,
*Now by judicial change of name, Harold R. Rafton.*